(12) United States Patent
Philips et al.

(10) Patent No.: US 8,676,699 B2
(45) Date of Patent: Mar. 18, 2014

(54) SYSTEM AND METHOD FOR RISK MONITORING OF RATED LEGAL ENTITIES

(75) Inventors: Madhu Philips, Ardsley, NY (US); Vimal Swaroop Rajamanur, Iselin, NJ (US)

(73) Assignee: Morgan Stanley, New York, NY (US)

(*) Notice: Subject to any disclaimer, the term of this patent is extended or adjusted under 35 U.S.C. 154(b) by 1 day.

(21) Appl. No.: 13/269,126

(22) Filed: Oct. 7, 2011

(65) Prior Publication Data

US 2012/0158576 A1     Jun. 21, 2012

Related U.S. Application Data

(60) Provisional application No. 61/390,941, filed on Oct. 7, 2010.

(51) Int. Cl.
*G06Q 40/00* (2012.01)

(52) U.S. Cl.
USPC .............................................. 705/38; 705/36

(58) Field of Classification Search
USPC ......................................................... 705/38
See application file for complete search history.

(56) References Cited

U.S. PATENT DOCUMENTS

| | | | |
|---|---|---|---|
| 7,565,316 B1 | 7/2009 | Amin et al. | |
| 2001/0018739 A1 | 8/2001 | Anderson et al. | |
| 2002/0178120 A1 | 11/2002 | Reid et al. | |
| 2003/0023527 A1 | 1/2003 | Wilce et al. | |
| 2004/0158520 A1* | 8/2004 | Noh ................................ | 705/38 |
| 2005/0010512 A1 | 1/2005 | Gutbrod et al. | |
| 2006/0059162 A1 | 3/2006 | Rizk et al. | |
| 2007/0078742 A1 | 4/2007 | Biase | |

(Continued)

FOREIGN PATENT DOCUMENTS

| | | |
|---|---|---|
| JP | 2002-041778 A | 2/2002 |
| JP | 2002-279174 A | 9/2002 |
| KR | 10-2007-0080093 A | 8/2007 |
| KR | 10-2009-0086370 A | 8/2009 |

OTHER PUBLICATIONS

Ishikawa Harutaka; System and Method for Supporting Dealings and Computer-Readable Recording Medium; Oct. 31, 2000; JPO & JAPIO; 14/3,K/22 (Item 22 from file: 347).*

(Continued)

*Primary Examiner* — Ella Colbert
*Assistant Examiner* — Michael Cranford
(74) *Attorney, Agent, or Firm* — Duane Morris LLP

(57) ABSTRACT

Methods and systems for risk monitoring and reporting impacts of credit ratings on rated legal entities are provided. In a method of reporting an impact of credit ratings on a rated legal entity, a plurality of credit rating terms related to a rated legal entity are converted to at least one logical trigger comprising one or more logical expressions. The credit rating terms may impact performance of a legal right or obligation associated with the rated legal entity. The trigger(s) are stored in a computer database. At least one trigger is retrieved from the database. A status for one of the retrieved triggers is evaluated based on predetermined values of the logical expression(s) of the retrieved trigger. Status information for at least one rated legal entity is displayed based on the evaluated status of the retrieved trigger(s).

44 Claims, 11 Drawing Sheets

(56) References Cited

U.S. PATENT DOCUMENTS

| | | |
|---|---|---|
| 2008/0162515 A1* | 7/2008 | Dovas et al. .............. 707/100 |
| 2008/0167981 A1 | 7/2008 | Whitehurst et al. |
| 2008/0208655 A1 | 8/2008 | Russo et al. |
| 2008/0235227 A1 | 9/2008 | Kwok et al. |
| 2008/0306894 A1 | 12/2008 | Rajkumar et al. |
| 2009/0216545 A1 | 8/2009 | Rajkumar et al. |
| 2009/0281853 A1 | 11/2009 | Misvaer et al. |
| 2009/0281932 A1 | 11/2009 | Axilrod et al. |

OTHER PUBLICATIONS

May R R; Internet-protocol based anonymous trading system for derivative trading; Oct. 14, 1997; Thomson Reuters; 7/3,K/1 (Item 1 from file: 350).*

Wenxuan Ding1, Gee kin Yeo1; A Decision Support System for Bank Credit Evaluation Under Risk; Nov. 1996; The IET; 13/3,K/4 (Item 4 from file: 2).*

* cited by examiner

SYSTEM AND METHOD FOR RISK MONITORING OF RATED LEGAL ENTITIES

CROSS-REFERENCE TO RELATED APPLICATION

This application claims priority under 35 U.S.C. §119(e) from U.S. Provisional Application Ser. No. 61/390,941, filed Oct. 7, 2010, the entirety of which is hereby incorporated herein by reference.

BACKGROUND

Risk management, monitoring, and reporting are important considerations in a variety of contexts involving financial and legal transactions. Parties to a deal (e.g., agreement, transaction, or other contractual instrument that creates rights and/or obligations for one or both parties) often enter into the deal with an understanding as to what obligations may be incumbent upon the parties in an event that specified occurrences transpire in the future. Various vehicles or instruments may pertain to an underlying asset and may involve certain rights or obligations associated therewith. For example, in an event that a credit rating of an underlying asset (e.g., a security) falls below a specified threshold, a party to the deal may be subject to an obligation to cure (remedy) the situation such as posting collateral, procuring a guarantee in the form of an indemnity, or in various other ways. Collateral posting options may include, but are not limited to, any of the following: mark to market (MTM, or accounting for the value of an asset or liability based on the current market price of the asset or liability or similar assets or liabilities); premium over MTM; aggregate of all premiums due; present value; and weighted average life of trade. Typically, such cures have associated time requirements. Conventionally, maintenance and monitoring of deals and cures has been a cumbersome task for several reasons.

One challenge associated with risk monitoring of rated legal entities related to a deal portfolio is the sheer volume of deals that is typically present. For example, a deal operator (e.g., one who performs risk management or monitoring functions associated with deals) may have to maintain and/or supervise a portfolio of hundreds or even thousands of deals. Another challenge is that each deal may have sophisticated, complex legal provisions pertaining to conditions that may necessitate a cure, e.g., to avert a ratings downgrade for a party or some other adverse consequence.

Example 1

Language pertaining to a typical ratings downgrade trigger in a governing deal document may state in part: "(a) (1) the long-term rating assigned by S&P to the unsecured, unsubordinated debt of Party A's Credit Support Provider falls below the then current rating of the highest rated Class of Notes and (2) the short-term rating assigned by S&P to the unsecured unsubordinated debt of Party A's Credit Support Provider falls below "A-1"+ Party A shall within thirty days ...."

This example may be translated as follows. Parsing the legal terminology of the foregoing trigger (rule), one perceives that Party A must perform a specified action within thirty days in the event that a specified condition related to S&P ratings (a type of credit rating issued by Standard & Poor's) is satisfied. The specified condition is that (1) Party A's S&P long term rating is downgraded below the then current rating of the highest rated Class of Notes and (2) Party A's S&P long term rating is downgraded below A–1+ (which is a particular rating). If both of these logical expressions are met (as required by the conjunctive "AND" terminology), then the trigger is said to have been breached, and Party A must perform a cure within thirty days as stated above.

Such legal language in a deal document is unwieldy even for trained professionals. Conventionally, an individual conducting risk management functions associated with deals must manually keep track of multiple deals and associated governing documents, must identify and scrutinize the particular section(s) of each governing document pertaining to ratings downgrade triggers (for example) and associated cure provisions, and must manually check the current ratings implicated by those sections of the governing documents. Performing risk management tasks in this manner is slow, cumbersome, and prone to error.

SUMMARY

In some embodiments, multiple credit rating terms related to a rated legal entity are converted to at least one logical trigger including one or more logical expressions. The credit rating terms may impact performance of a legal right or obligation associated with the rated legal entity. The trigger(s) may be stored in a computer database. At least one trigger may be retrieved from the database. A status for one of the retrieved triggers may be evaluated based on predetermined values of the logical expression(s) of the retrieved trigger. Status information for at least one rated legal entity may be displayed based on the evaluated status of the retrieved trigger(s).

In some embodiments, a system for reporting an impact of credit ratings on a rated legal entity may include a database, a computer database, a computer processor, and a computer readable storage medium. The database may be configured to store a plurality of triggers. Each trigger may include one or more logical expressions representing credit rating terms of a rated legal entity among a plurality of rated legal entities. The computer readable storage medium may have computer-executable instructions stored on it. When executed, the instructions may cause the processor to: retrieve at least one trigger from the database, evaluate a status for one of the retrieved triggers based on predetermined values of the logical expression(s) of the retrieved trigger(s); and display status information for at least one rated legal entity based on the evaluated status of the retrieved trigger(s).

In some embodiments, at least one logical trigger may be retrieved from a computer database. The logical trigger(s) may include at least one logical expression representing credit rating terms of a rated legal entity among a plurality of rated legal entities. A status for one of the retrieved triggers may be evaluated based on current values of the logical expression(s). At least one of the retrieved triggers, having a trigger status corresponding to a trigger breach, may be selected. At least one cure option for the selected trigger may be selected. An indication may be provided that a cure has been initiated for the selected trigger. Cure information corresponding to the initiation of the cure may be stored in the database.

In some embodiments, a system for monitoring an impact of a ratings downgrade cure of a rated legal entity may include a computer database, a computer processor, and a computer readable storage medium. The database may be configured to store a plurality of triggers. Each trigger may include one or more logical expressions representing credit rating terms of a rated legal entity among a plurality of rated legal entities. The computer readable storage medium may have computer-executable instructions stored on it. When executed, the instructions may cause the processor to: retrieve, from the computer database, at least one logical trigger comprising at least one logical expression representing credit rating terms of the rated legal entity; evaluate a status for one of the retrieved triggers based on current values of the logical expression(s); select at least one of the retrieved triggers having a trigger status corresponding to a trigger breach; select at least one cure option for the selected trigger; provide an indication that a cure has been initiated for the selected trigger; and store cure information in the database corresponding to the initiation of the cure.

BRIEF DESCRIPTION OF THE DRAWINGS

The following will be apparent from elements of the figures, which are provided for illustrative purposes and are not necessarily to scale.

FIG. 4 is a depiction of an example screenshot showing identification of logical expressions in triggers based on status.

FIG. 5 is a depiction of an example screenshot of a deal listing screen associated with the deal monitoring tool in accordance with some embodiments.

FIG. 7 is a depiction of an example screenshot showing cure tracking functionality in accordance with some embodiments.

FIG. 8 is a depiction of an example screenshot of a cure audit tool in accordance with some embodiments.

FIG. 9 is a depiction of an example screenshot showing document mapping functionality in accordance with some embodiments.

DETAILED DESCRIPTION

Figure 1:
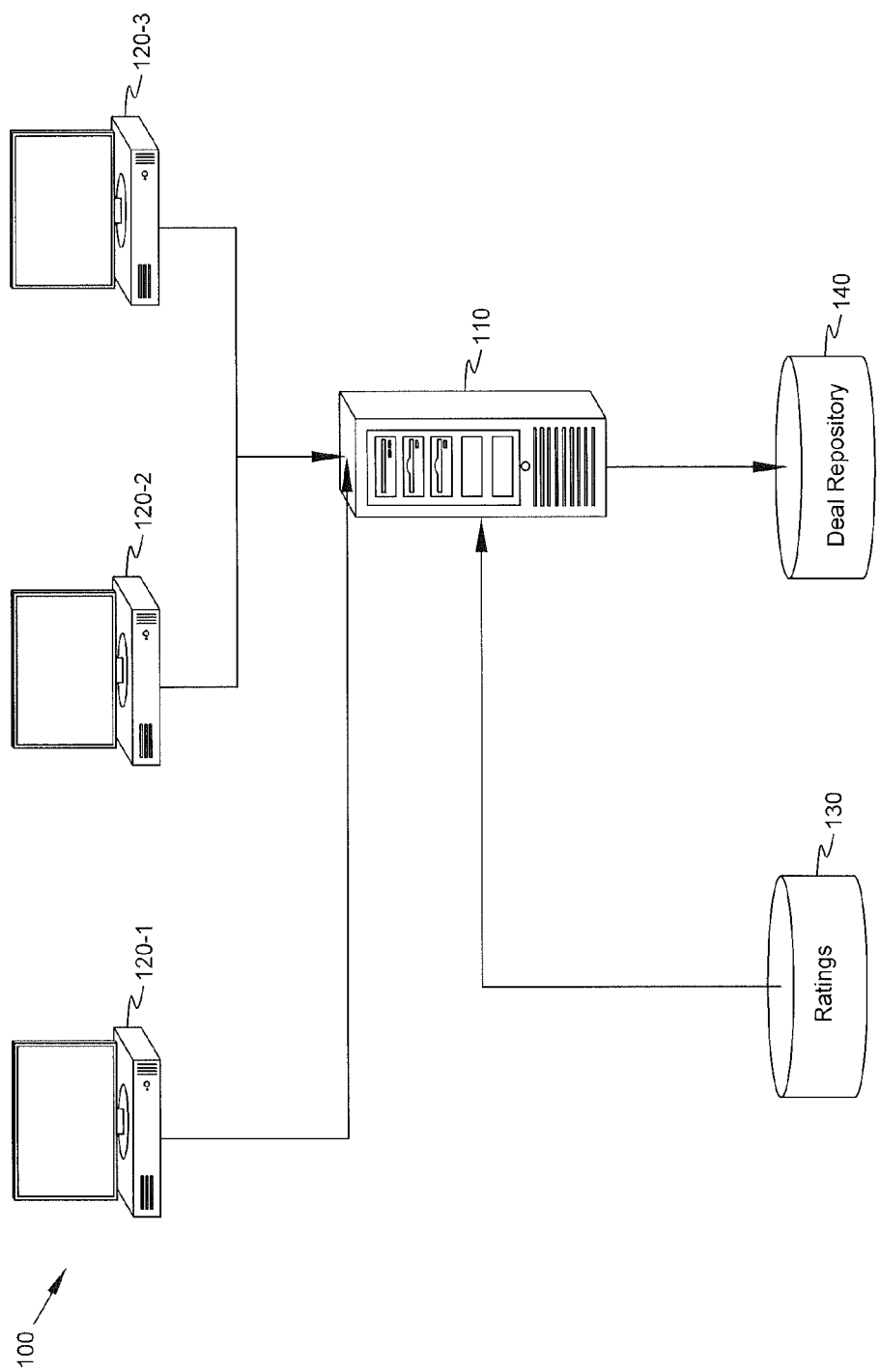
FIG. 1 is a block architecture diagram in accordance with some embodiments.

This description of the exemplary embodiments is intended to be read in connection with the accompanying drawings, which are to be considered part of the entire written description.

Various embodiments address the foregoing deficiencies of conventional risk monitoring/management techniques for rated legal entities. The complex language in deal documents pertaining to triggers and cures is isolated from downstream processing. By mapping the legal terminology into a common framework based on logical expressions as described below, various embodiments enable systematic risk monitoring processing in a manner that scales effectively to large numbers of deals.

Conversion of Legal Terminology into Logical Triggers

As discussed above, triggers found in legal documents that govern a deal are typically expressed in complex legal language that is not susceptible to easy interpretation. Each trigger (rule) may specify that a particular action must be performed if a particular condition is satisfied, but it may be difficult to identify the logic of the rule, much less determine whether the condition is satisfied. In some embodiments, such legal language pertaining to triggers is converted to Boolean logical triggers (rules) to permit simplified processing in a variety of ways downstream. The converted triggers are expressed in a Boolean logic format that may involve a single logical expression that evaluates to TRUE or FALSE, or multiple logical expressions (or subexpressions), each of which evaluates to TRUE or FALSE and which are combined by the rules of Boolean logic (e.g., using logical connectors). Several examples of such conversion of legal terminology into logical triggers are presented below to aid in understanding and in no way are intended to limit the scope of the disclosure.

Example 2

A governing deal document states, "(a) (1) the long term rating assigned by Moody's to the unsecured, unsubordinated debt of Party A's Credit Support Provider falls to or below "Aa3 on negative watch" or (2) the short term rating assigned by Moody's to the unsecured, unsubordinated debt of Party A's Credit Support Provider falls to or below "P1 on negative watch", and (b) the long term rating assigned by Moody's to the unsecured, unsubordinated debt of Party A's Credit Support Provider falls below the higher of "Baa1" and the then current rating of the highest rating of the highest rated Class of Notes, Party A shall within thirty days . . . ."

Translation: (a) (1) Party A's Credit Support Provider's Moody's long term rating is Aa3 on negative watch or (2) Party A's Credit Support Provider's Moody's short term rating is P1 on negative watch, AND (b) Party A's Credit Support Provider's Moody's long term rating is less than the higher of (1) Baa1 and (2) current rating of the highest rated Class of Notes. As understood by one of ordinary skill in the art, "on negative watch" (ONW) means that a particular entity has a 50% chance of being downgraded in the next three months. Thus, the trigger is: ((a1) or (a2)) AND ((b1) or (b2)), where, a1 is "Moody's long term rating is or is below Aa3 ONW, a2 is "Moody's short term rating is or is below P1 ONW", b1 is "Moody's long term rating is or is below Baa1", and b2 is "Moody's long term rating is or is below the highest rated class of notes."

Although the legal language states "falls below the higher of . . . AND . . . ", the joiner (logical connector) between statement (b)(1) and (b)(2) is (in a Boolean logic sense) "OR". Clause (b) fails when either (b)(1) or (b)(2) occurs. The subtlety of the possible misinterpretation in this example is illustrative of the complexity of the risk manager's task under conventional approaches. Conventionally, risk managers must manually interpret the foregoing legal language each time an issue related thereto is considered, increasing the likelihood that an error in interpretation may be made at some point in time. By isolating the parsing of legal terminology into a common Boolean-logical trigger framework upstream of later processing, such errors may be averted, because in various embodiments the converted triggers that are in a common Boolean logical format are evaluated automatically.

Example 3

A governing deal document states, "In the event that any Notes rated by Moody's remain outstanding, (x) if Party A's Credit Support Provider has no short-term unsecured, unsubordinated debt rating by Moody's, the long term debt rating assigned by Moody's to the unsecured, unsubordinated debt of Party A's Credit Support Provider falls below Aa3 (or Aa3 and is on watch for downgrade), or (y) if Party A's Credit Support Provider has both short term and long term ratings by Moody's, the short term unsecured, unsubordinated debt rating assigned by Moody's to the unsecured, unsubordinated debt of Party A's Credit Support Provider falls below "P1" (or is "P1" and is on watch for downgrade) or the long term debt rating assigned by Moody's to the unsecured, unsubordinated debt of Party A's Credit Support Provider falls below "A1" (or is "A1" and is on watch for downgrade) (either downgrade under the foregoing clause (x) and (y), a "Moody's downgrade"), Party A shall . . . ."

Translation: (x) (1) Party A's Credit Support Provider has no short term Moody's rating and (2) Party A's Credit Support Provider's long term rating is below Aa3 on negative watch for downgrade OR (y) (1) Party A's Credit Support Provider's short term Moody's rating is below P1 on negative watch for downgrade or (2) Party A's Credit Support Provider's long term Moody's rating is below A1 on negative watch for downgrade. Thus, the trigger in converted form is: ((x1) and (x2)) OR ((y1) or (y2)), where x1 is "no Moody's short term rating exists", x2 is "Moody's long term rating is or is below Aa3 ONW", y1 is "Moody's short term rating is or is below P1 ONW", and y2 is "Moody's long term rating is or is below A1 ONW".

Example 4

A governing deal document states, "S&P Rating Trigger shall have the following meaning as in Table 1:"

TABLE 1

| Current S&P Rating of Class B Certificates | S&P Rating Trigger |
|---|---|
| AAA through AA- | S&P short-term debt rating of at least A-1+ (or, where Party A's Credit Support Provider does not have an S&P short-term debt rating, an S&P long-term debt rating of at least AA-) |
| A+ through A- | S&P short-term debt rating of at least A-2 and S&P long-term debt rating of at least A- |

Translation: This is an example in which two triggers are implicated. Various embodiments permit specification of a first, second, and third trigger downgrade. Here, the first and second triggers are as follows. First Trigger Downgrade: if the Class B Certificates have an S&P rating at or above AA-, then Party A's Credit Support Provider must have a short-term debt rating of at least A-1+, or should no short term rating exist, a long-term debt rating of a least AA-. Second Trigger Downgrade: if the Class B Certificates have an S&P rating at A+ through A-, then Party A's Credit Support Provider must maintain both a short term rating of A-2 and a long-term debt rating of A-. Note: in this case, if either requirement is not met, the rating requirement is breached. For the avoidance of doubt, because the cure requirements in this particular example are the same at both rating downgrade levels, it could also be appropriately viewed as having two "First Triggers". Where there are numerous trigger levels, this approach of inputting two "First Triggers" may be necessary to save room in the "Second Trigger" and "Third Trigger" rule category inputs for the other levels.

Conversion of Legal Terminology into Cure Expressions

Various cure options may also be entered using the same Boolean logic framework that employs logical connectors. Cures may be mapped to particular triggers. In some embodiments, multiple cures may be mapped to a single trigger, and a single cure may be mapped to multiple triggers, to provide flexibility regarding the structuring of cures and triggers.

Several examples regarding legal terminology that is converted into cure expressions are presented below.

Example 5

A governing deal document states, "Upon downgrade, Party X shall: within 10 Business Days of the date of the Moody's Downgrade (provided, that, the rating assigned by Moody's to the unsecured, unsubordinated debt of Party A's Credit Support Provider does not fall below "A3" in the case of its long term rating or fall below "P-2" in the case if its short term rating), post Collateral in accordance with the CSA; or within 20 Business Days of the date of the Moody's Downgrade, transfer all of its rights and obligations under this Agreement to another entity with the Required Ratings or whose credit support provider has the Required Ratings; or within 20 Business Days of the date of the Moody's Downgrade, cause an entity with the Required Ratings to guarantee or provide an indemnity in respect of Party A's obligations under this Agreement in a form and substance reasonably satisfactory to Moody's."

Translation: The cure language above is responsive to two ratings downgrade trigger levels. The first level permits posting, transfer and guarantee cure options. The second trigger (where Party X falls below A3 long-term or P-2 short-term) permits only transfer and guarantee cure options.

Example 6

A governing deal document states, "Upon downgrade, Party X shall within 20 days thereafter, either: (A) transfer all of its rights and obligations under this Agreement to another entity with the Required Ratings or whose credit support provider has the Required Ratings, or cause an entity with the Required Ratings to guarantee or provide an indemnity in respect of Party A's obligations under this Agreement subject to Rating Agency Confirmation; or (x) post Collateral in accordance with the Credit Support Annex between Party A and Party B dated as of the date hereof and attached hereto as Exhibit A (the "CSA") and (y) if the short-term rating assigned by S&P to the unsecured, unsubordinated debt of Party A's Credit Support Provider falls below "A-2" then, within 10 Business Days of such downgrade, provide a legal opinion regarding the ability of Party B to exercise its rights under Paragraph 8(a) of the Credit Support Annex. Such legal opinion shall be subject to Rating Agency Confirmation.

Translation: The cure language above is responsive to two ratings downgrade trigger levels. The first level permits posting, transfer and guarantee cure options within 20 calendar days (CD). The second trigger (where Party X falls below A-2 short-term) also permits posting, transfer, and guarantee cure options within 20 CD. However, if one elects to post collateral, one must also obtain a legal opinion within 10 CD of falling below A-2 short-term.

Underlying Asset

Risk monitoring relating to various types of underlying assets in deals may be performed with embodiments disclosed herein. Underlying assets may include, but are not limited to: an asset related to a particular party X, e.g., X-arranged deal or special purpose vehicle (SPV) (vehicle created for a special purpose), X counterparty swap (non-interest rate or cross-currency swap) or X-issued obligation, etc.; a privately-negotiated, bilateral contract providing credit support to the SPV, e.g., GIC (guaranteed investment contract in SPV collateral) or TRS (total return swap in SPV collateral); an asset subject to a credit rating trigger based upon that sole asset; an asset subject to a market value trigger based upon that sole asset; an asset that is the subject of an SPV mandatory redemption event or SPV event of default based upon that sole asset that could potentially unwind the SPV deal; and/or an asset that is the subject of an ISDA (International Swaps and Derivatives Association) Additional Termination Event based upon that sole asset. Underlying assets may include bonds, notes, loans, pass-through certificates, credit cards, deposit accounts, liquidity funds, letters of credit/liquidity agreements, repurchase transactions, student loans, supersenior swaps, U.S. Treasury securities, or other underlying assets as is known in the art. As used herein, a "Mandatory Redemption Event" or "Event of Default" is an event the occurrence of which: (i) is a negative event that would cause all outstanding obligations of the SPV to become due and payable immediately without any further action by any person, including by any agent of the SPV (e.g., trustee) or holder of any issued security; or (ii) is a negative event not in the ordinary course of business that would permit one or more persons the right to exercise the option to declare (notwithstanding any requirement of passage of time or giving of notice or both) any issued securities of the related SPV to become due and payable earlier than the date such securities would be otherwise due. Example of types of negative events for purposes of this clause (ii) are the occurrence of a tax event or breach of a coverage test.

Architecture

FIG. 1 is a block architecture diagram in accordance with some embodiments. In a system 100, a server 110, which may be a web server, is connected over a network to nodes 120-1, 120-2, and 120-3 (collectively nodes 120), each of which may have a browser to provide connectivity for a user. Any number of nodes and browsers may be used. Server 110 may be connected to a computerized ratings database 130 that stores ratings information and to a computerized deal repository database 140 that stores deal information. Information associated with a deal's trigger provisions and/or cure provisions may be stored at deal repository 140 or in another database (not shown) that is connected to server 110.

Figure 2:
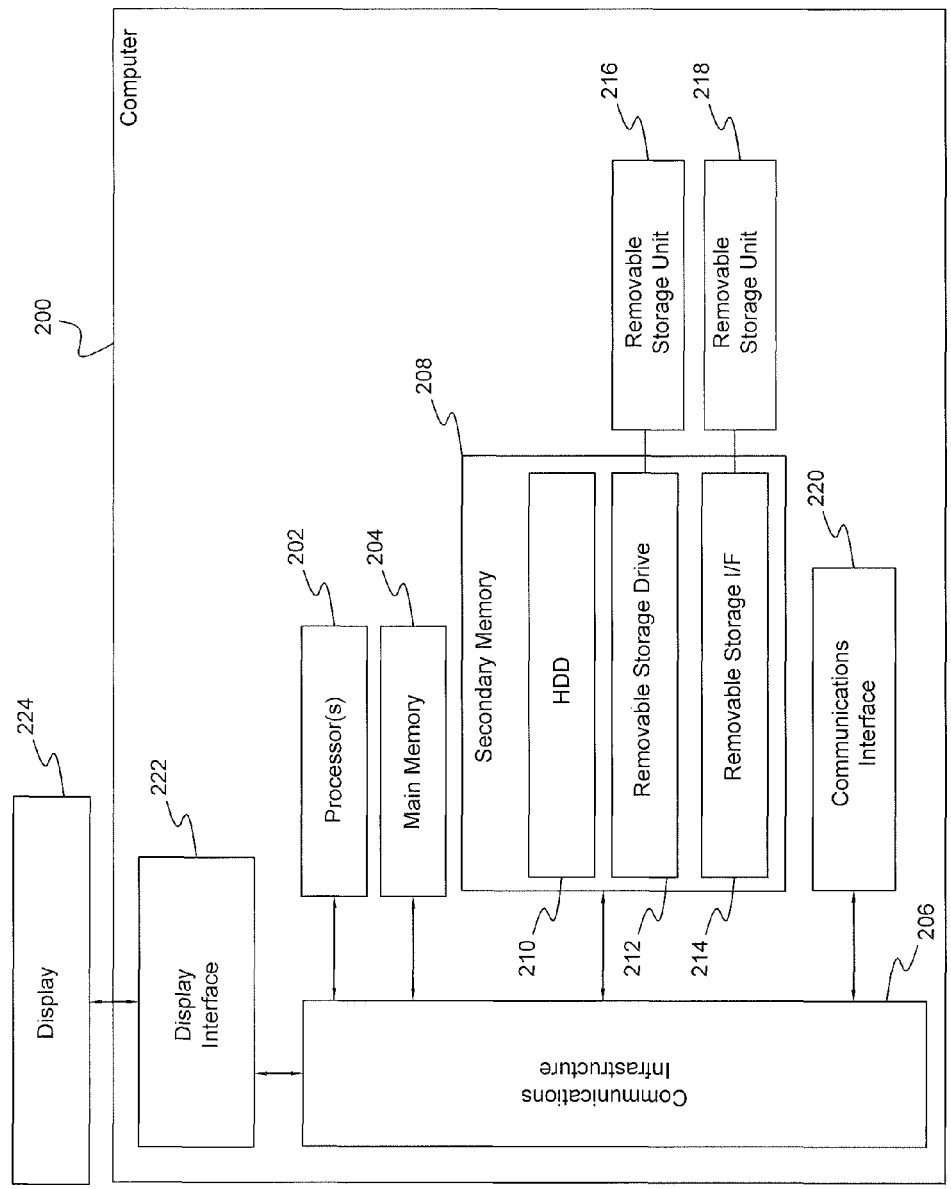
FIG. 2 is a block diagram of a computer system architecture in accordance with some embodiments.

Risk monitoring and reporting systems may be implemented in software and presented to a user on a monitor or other display device. In some embodiments, such systems may be presented to a user as a graphical user interface (GUI) on a display device such as a computer monitor. FIG. 2 illustrates one example of an architecture of a computer system 200 configured to implement nodes 120 of FIG. 1. As illustrated in FIG. 2, computer system 200 may include one or more processors 202. Each processor 202 is connected to a communication infrastructure 206 (e.g., a communications bus, cross-over bar, or network). Computer system 200 may include a display interface 222 that forwards graphics, text, and other data from the communication infrastructure 206 (or from a frame buffer not shown) for display on the display unit 224.

Computer system 200 may also include a main memory 204, such as a random access memory (RAM), and a secondary memory 208. The secondary memory 208 may include, for example, a hard disk drive (HDD) 210 and/or removable storage drive 212, which may represent a floppy disk drive, a magnetic tape drive, an optical disk drive, a memory stick, or the like as is known in the art. The removable storage drive 212 reads from and/or writes to a removable storage unit 216. Removable storage unit 216 may be a floppy disk, magnetic tape, optical disk, or the like. As will be understood, the removable storage unit 216 may include a computer readable storage medium having tangibly stored therein (embodied thereon) data and/or computer software instructions, e.g., for causing the processor(s) to perform the operations described below in the context of FIGS. 10 and/or 11.

In alternative embodiments, secondary memory 208 may include other similar devices for allowing computer programs or other instructions to be loaded into computer system 200. Secondary memory 208 may include a removable storage unit 218 (which may be similar to removable storage unit 216) and a corresponding interface 214, which may be similar to removable storage drive 212. Examples of such removable storage units include, but are not limited to, USB or flash drives, which allow software and data to be transferred from the removable storage unit 218 to computer system 200.

Computer system 200 may also include a communications interface 220. Communications interface 220 allows software and data to be transferred between computer system 200 and external devices such as server 110. Examples of communications interface 220 may include a modem, Ethernet card, wireless network card, a Personal Computer Memory Card International Association (PCMCIA) slot and card, or the like. Software and data transferred via communications interface 220 may be in the form of signals, which may be electronic, electromagnetic, optical, or the like that are capable of being received by communications interface 220. These signals may be provided to communications interface 220 via a communications path (e.g., channel), which may be implemented using wire, cable, fiber optics, a telephone line, a cellular link, a radio frequency (RF) link and other communication channels.

In this document, the terms "computer program medium" and "computer readable storage medium" refer to media such as media at removable storage drive 212, or a hard disk installed in hard disk drive 210, or removable storage unit 216. These computer program products provide software to computer system 200. Computer programs (also referred to as computer control logic) may be stored in main memory 204 and/or secondary memory 208. Computer programs may also be received via communications interface 220. Such computer programs, when executed by a processor, enable the computer system 200 to perform the features of the methods discussed herein. For example, main memory 204, secondary memory 208, or removable storage units 216 or 218 may be encoded with computer program code (instructions) for performing operations corresponding to the processes shown in FIGS. 10-11.

In an embodiment implemented using software, software instructions may be stored in a computer program product and loaded into computer system 200 using removable storage drive 212, hard drive 210, or communications interface 220, for example. In other words, the computer program product, which may be a computer readable storage medium, may have instructions tangibly embodied thereon. The software instructions, when executed by a processor 202, cause the processor 202 to perform the functions of (operations of) methods described herein. In another embodiment, the method may be implemented primarily in hardware using, for example, hardware components such as a digital signal processor comprising application specific integrated circuits (ASICs). In yet another embodiment, the method is implemented using a combination of both hardware and software.

Life Cycle of SPV

Figure 3:
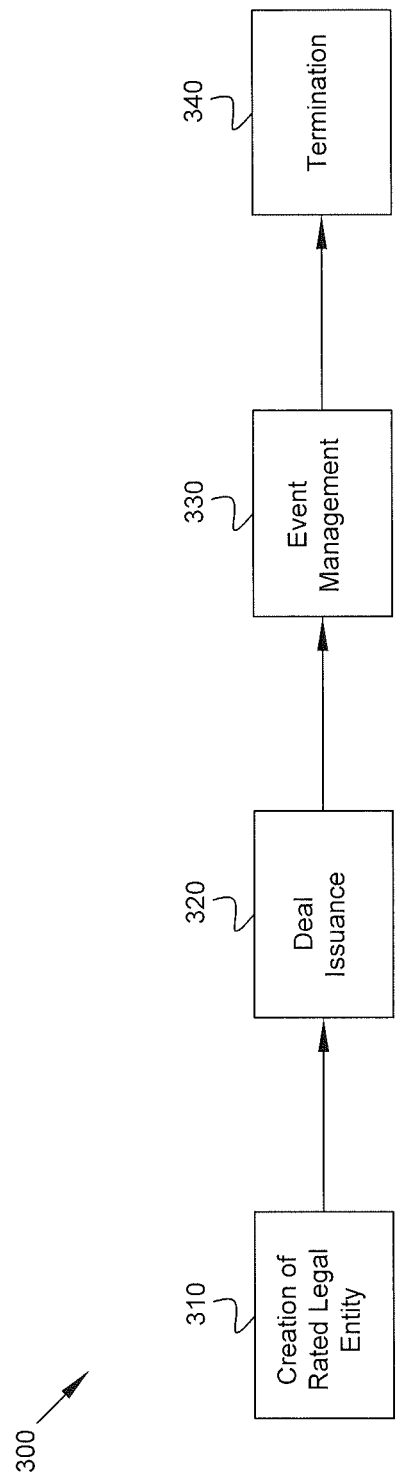
FIG. 3 is a flow diagram of a life cycle of a Special Purpose Vehicle (SPV) in accordance with some embodiments.

FIG. 3 is a flow diagram of a life cycle 300 of a Special Purpose Vehicle (SPV) in accordance with some embodiments. Various embodiments may be used with deals involving other vehicles or instruments other than SPVs, e.g., real estate investment trusts (REITs) or any over the counter (OTC) deal; SPVs are described herein for convenience. At block 310, an SPV may be created. At block 320, a deal may be issued. At block 330, event management may be conducted. At block 340, the SPV may be terminated. Each of these blocks is described in detail below.

At block 310, a deal may be initiated. Typically, a risk manager for the SPV inputs the terms of the deal. Inputted logic associated with triggers and/or cures may be automatically evaluated by a rule engine to determine if the inputted logic contains any errors, e.g., any malformed logical expressions. The rule engine may be located in the processor(s) 202, the server 110, or other useful location as is known in the art. In this way, any errors are identified and isolated upstream and prevent contamination of downstream processing. A risk manager may correct any such errors as needed. At this stage, notifications of any changes in deal progression status may be sent to the appropriate parties.

At block 320, the SPV Risk Manager may enter the final deal terms. The final documents may be uploaded to a database, e.g., database 140. At this stage, notifications of any changes in deal progression status may be sent to the appropriate parties.

At block 330, downgrade triggers may be processed. The rule engine automatically evaluates triggers on an ongoing basis and notifies a user if a breach occurs (i.e., if a trigger is breached). Automatic evaluation of triggers may have a propagating effect on all deals, eliminating the conventional hurdle of handling respective deals separately. For example, if a rating affecting logical expressions or subexpressions in one or more triggers falls so as to breach the trigger(s), an impact of such a rating change can immediately be gauged for all deals that are affected.

At block 340, an SPV may be removed from the system. The deal may be unwound at this stage.

Embodiments may provide various facilities for a user to enter (input) a trigger or a trigger exception (discussed further below). For example, triggers may be entered by a user manually typing (or otherwise inputting) the various elements in expressions of a trigger. Alternatively, in some embodiments users may build up expressions and then combine expressions into a trigger. In some embodiments, expressions and/or triggers may be saved in a library for modularity and portability benefits not available with conventional manual evaluation of triggers.

Embodiments provide various types of functionality related to deals, triggers, and cures, including a deal monitoring tool, a risk calendar tool, and a cure audit tool. These functionalities are briefly described below and then addressed in greater detail.

The deal monitoring tool provides various information related to a portfolio of deals to a deal administrator (also referred to as a deal manager or deal operator). A deal population (listing of all deals) may be displayed along with the status of each deal. Deal status information may include applicable rating downgrade triggers pertaining to the deal and a status of the triggers. Trigger information may be displayed with respect to particular parties to the deal or with respect to underlying assets. The deal monitoring tool enables a cure to be applied to a rating downgrade trigger. Additionally, specific deal documents, sections, and pages that set forth applicable rating downgrade trigger and cure selection provisions are displayed and made accessible. In some embodiments, links to electronic versions of the deal documents are provided.

The risk calendar tool provides a calendar view of cure posting timelines associated with breached triggers. This tool also enables a cure to be applied to a rating downgrade trigger.

The cure audit tool provides a display of all applied cures. This tool is especially useful for supervisory risk officers who are tracking the activities of various personnel handling deals. The cure audit tool provides the ability to monitor applied versus available cure options for a particular trigger.

RAG Status Definition

In some embodiments, various identifiers are used to denote different levels of risk. For example, a three-tiered identifier approach may use a first level to denote a highest level of risk, a second level to denote a second highest level of risk, and a third level to denote a third highest level of risk. In some embodiments, the highest level of risk indicates a trigger failure (trigger breach), the second highest level of risk corresponds to a situation of being equal to or within one notch of a trigger failure. A notch may be a gradation in the ratings industry, as understood by one of ordinary skill in the art. For example, if the current rating of a particular security is 'A' and a corresponding trigger would be breached when the security falls to 'A−', then the trigger may be at the second highest level of risk. The third highest level of risk may correspond to a situation in which trigger failure is more than one notch away (e.g., current rating is 'A' and failure (breach) occurs at 'BBB'). In some embodiments, the levels of risk are assigned colors that promote easy perception of risk when the levels are displayed to a viewer. For example, colors such as red, amber, and green (denoted herein as "RAG") may be assigned to the first, second and third levels described above, respectively. Another color may be used for logical expressions or subexpressions that cannot be evaluated logically (e.g., in an error case), and another color (e.g., blue) may be used for previously breached (i.e., red) triggers that have subsequently been cured (i.e., that have had a completed cure applied). In some embodiments, blue is used at the overall trigger level rather than for individual logical subexpressions that form a trigger.

Display of Expressions in Triggers

Figure 4:
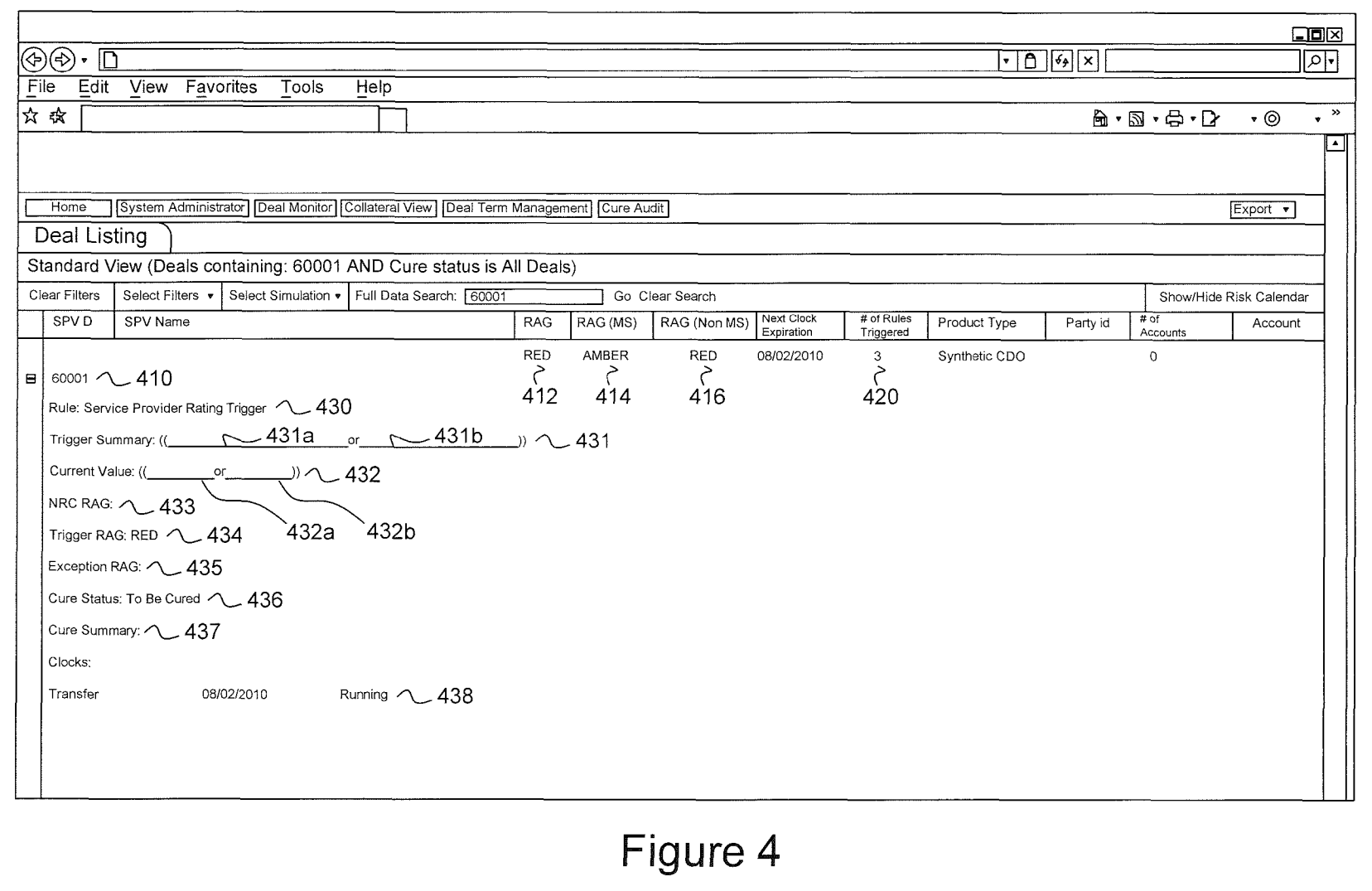

FIG. 4 is a depiction of an example screenshot showing identification of logical expressions in triggers based on status. Various information related to a particular vehicle (e.g., SPV) 410 is displayed. A trigger identifier 430 identifies the trigger; trigger, as used here, is synonymous with rule. Multiple triggers may be associated with an SPV, although only one trigger is shown in FIG. 4 for convenience. A trigger summary 431 shows the underlying logical subexpressions (logical terms) that define the trigger. Here, the trigger summary is "Party A(DBRS-ST)<R−1 middle OR Party B(DBRS-LT)<AA low". It is understood that DBRS is a particular type of rating, ST and LT denote short and long term, respectively, and R−1 middle and AA low are particular rating values (ratings). The logical expressions 431a and 431b joined by the connector OR are displayed in colors indicating a status of each expression. In this example, Party A(DBRS-ST) is currently rated at R−1 (middle) and Party B(DBRS-LT) is currently rated at A high, which is less than AA low. Expression 431a is one notch away from being breached, and expression 431b is breached; these expressions are shown in a manner that makes this clear. For example, expression 431a may be shown in amber (or yellow), and expression 431b may be shown in red. In the black-and-white representation of FIG. 4, color is not shown but is understood to be present. It is understood that various formatting techniques (e.g., font color, highlight color, underlining, italicization, font size, font type, etc.) may be used to denote the risk levels. In some embodiments, expressions (or overall triggers comprising expressions) that have GREEN status are not actually displayed in green (or with any distinctive color or formatting); rather, only expressions or triggers at RED or AMBER status are marked with colors or other special formatting. In this manner, the human eye is naturally drawn to only those expressions or triggers that are at or near breach.

The current value 432 is displayed, showing the actual values of the variables (in this case rating values for entities/securities referenced in the rule) that form the respective expressions 431a and 431b. For example, current value listing 432a shows "R−1 middle<R−1 middle" and may be displayed in AMBER, and current value listing 432b shows "A high<AA low" and may be displayed in RED.

In some embodiments, a special value such as 'N/F' (not found) may be used for ratings that are not found by the rule engine; N/F may be assigned the highest risk level. A rating value of "null" may refer to portions of a rule that were not evaluated. For example, if a rule specifies, "If no short term rating exists, use the long term rating," and if a short term rating does exist for the entity in question, then this portion of the trigger may be ignored and the current rating may return "null". An overall trigger status (trigger RAG status) 434 corresponding to a trigger-level RAG status is displayed. The overall trigger status is computed as follows.

Combinational Logic for Triggers and Expressions

Expressions comprising a trigger are evaluated, and their respective RAG statuses (red, amber, or green) are combined in some embodiments using ternary logic. As used herein, "ternary" refers to the number of logical levels (three, for RAG), not the number of terms combined at a single evaluation. The ternary logic table specifying how RAG statuses for respective expressions are combined using the "AND" connector is provided in Table 2 ("R", "A", and "G" denote red, amber, and green, respectively).

TABLE 2

Logical combination table for ternary "AND" connector

|  | Expression 2 = R | Expression 2 = A | Expression 2 = G |
|---|---|---|---|
| Expression 1 = R | R | A | G |
| Expression 1 = A | A | A | G |
| Expression 1 = G | G | G | G |

The ternary logic table specifying how RAG statuses for respective expressions are combined using the "OR" connector is provided in Table 3.

TABLE 3

Logical combination table for ternary "OR" operator

|  | Expression 2 = R | Expression 2 = A | Expression 2 = G |
|---|---|---|---|
| Expression 1 = R | R | R | R |
| Expression 1 = A | R | A | A |
| Expression 1 = G | R | A | G |

In the example of FIG. 4, trigger RAG status 434 is RED, because expression 431a is at level AMBER and expression 431b is at level RED, and the combination of AMBER OR RED yields RED according to the combinatorial logic shown in Table 3. If additional triggers for SPV 410 were present, the trigger RAG status for each trigger may be combined in like manner to yield an overall deal status as discussed below.

Each expression in the triggers may be evaluated automatically based on predetermined values (e.g., current values as obtained from ratings database 130, or preset values in the case of a simulation mode). An overall deal status, which logically combines the statuses of all triggers associated with a deal, may be displayed at field 412. Thus, embodiments provide mechanisms for automatically evaluating and combining expressions for triggers using ternary logic and a RAG methodology that promotes effective risk monitoring and perception.

In some embodiments, exceptions to triggers may also be provided. An exception is a logical expression formed in a manner similar to triggers. If a trigger would otherwise be in a breached state but an exception to the trigger is satisfied, then the trigger is considered not to be breached. Users may input exceptions to the rule engine just as they input triggers. An exception RAG status 435 may be displayed. A cure status 436 (e.g., no cure required, to be cured, or cured), a cure summary 437 including details of applicable cure(s), and a clocks summary 438 may be displayed as shown in FIG. 4. Regarding the clocks summary 438, if the trigger has been breached (RED), a "due date" timeline for each applicable cure may be displayed. If the cure clock is running, the status may indicate "Running"; otherwise it may indicate "Completed".

A highest risk level for entities related to particular types of parties may also be displayed. For example, a highest risk level for any entity related to Party A (e.g., across all triggers for SPV 410) is displayed at field 414 (in this case, it is AMBER), and a highest risk level for any entity not related to Party A is displayed at field 416 (in this case, it is RED). Field 420 shows the number of rules triggered (i.e., the number of triggers breached).

Deal Listing

Figure 5:
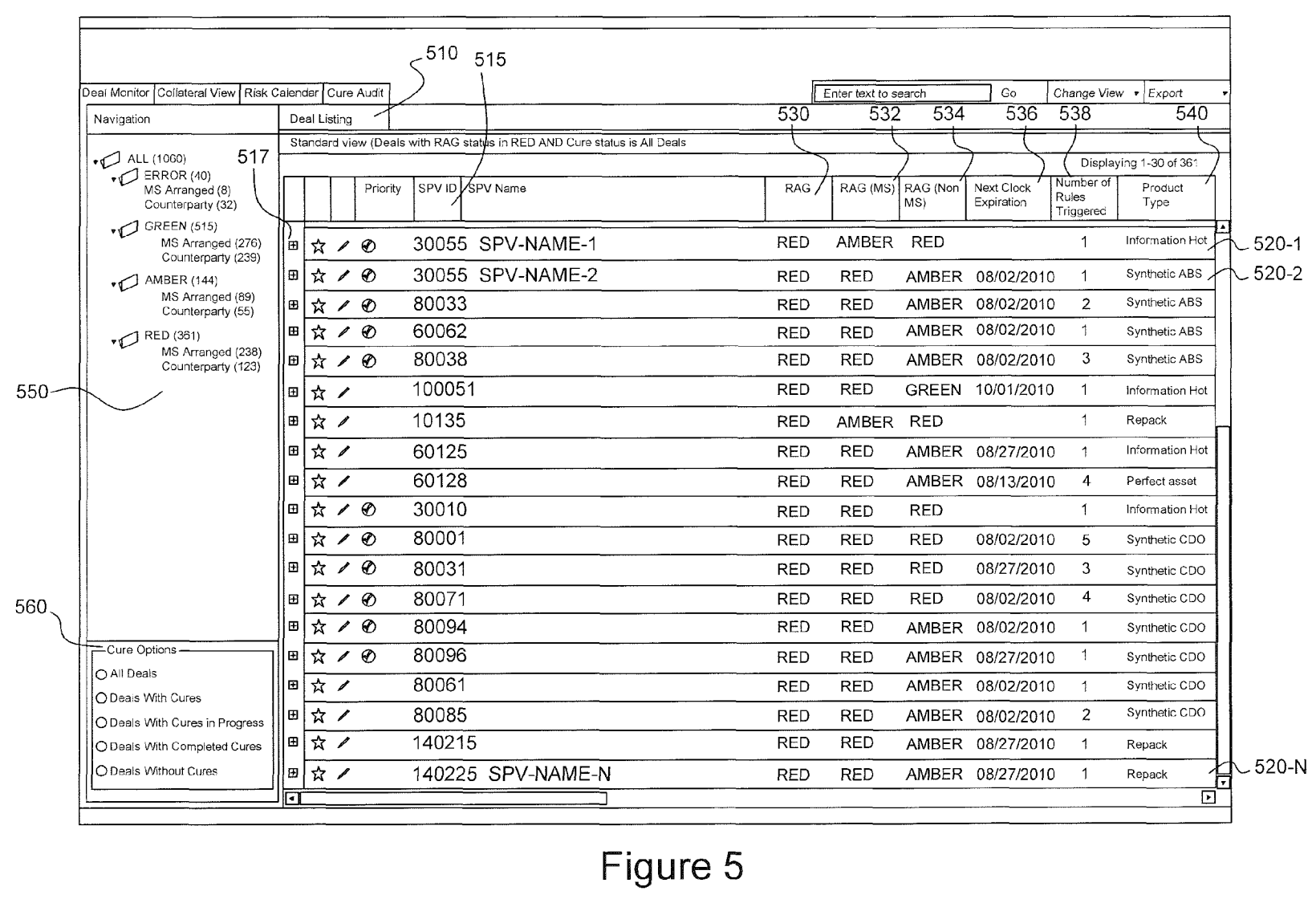

FIG. 5 is a depiction of an example screenshot of a deal listing screen associated with the deal monitoring tool in accordance with some embodiments, which provides the user the ability to: view a deal listing 510 in datasheet view; sort by any of the columns (e.g., by navigating to a column and clicking on a downward arrow that appears); hide columns (e.g., by navigating to column and clicking on downward arrow that appears); and filter by RAG ('Navigation' pane 550) and/or cure existence ('Cure Option' pane 560). Various deals 520-1, 520-2, 520-N (collectively 520) may be shown in rows, with each having an SPV ID 515. The following may also be displayed: an overall RAG status 530, first party highest risk level 532, second party highest risk level 534, next clock expiration 536, number of rules triggered 538, and product type 540.

In the navigation pane 550, the user may select only those deals with a particular RAG status, or only those deals for which a first party or a second party that is a counterparty to the first party has a particular RAG status. In the cure option pane 560, the user may select to view any of the following: all deals; deals with cures; deals with cures in progress; deals with completed cures; deals without cures. Filtering with panes 550 and 560 provides various possibilities for risk monitoring functionality. For example, selecting RED in navigation pane 550 shows all triggers that need to be cured, and selecting RED in navigation pane 550 along with 'Deals with Completed Cures' in cure options pane 560 shows all previously cured triggers that now need reevaluation due to a subsequent breached condition (expression) within the trigger.

Various items shown in FIG. 5 are described in Table 4.

TABLE 4

Explanation of items in FIG. 5

| Item | Explanation |
| --- | --- |
| SPV ID | Unique ID for each deal |
| SPV Name | Name of the SPV |
| RAG | Indicates the overall RAG status for the Deal |
| RAG (Party A) | Indicates the overall RAG status for the Deal for triggers related to entities of Party A |
| RAG (non-Party A) | Indicates the overall RAG status for the Deal for triggers related to parties other than the Party A |
| Next Clock Expiration | Date of the nearest due date associated with a cure action. Clocks start running when a trigger becomes RED |
| Number of Rules Triggered | Number of rules that are triggered (RED) for a particular deal |
| Product Type | Short description of deal, e.g., MBS (mortgage-backed security), CMBS (commercial mortgage-backed security), CDO (collateralized debt obligation), Re-pack, etc.) |

In some embodiments, a 'Change View' feature allows the user to toggle between 'Standard' view and 'Simulation' view. The Simulation view allows the user to select and apply preset rating values, as set by an SPV Risk Manager (i.e., not necessarily the actual current rating values as assigned by a ratings agency), to the evaluation of the rating trigger RAG status. The output of such simulations may be displayed under the Deal Listing header.

Some embodiments may provide free text search for data that is contained in the various deal data fields within the users' entire deal population. This search may be performed in conjunction with the filtering options in the Navigation pane 550.

Expanded information for individual deals may be provided in some embodiments. For example, a user may click on a '+' symbol 517 (or equivalent) next to a particular deal to expand the view for that deal. Various deal-specific information as in FIG. 4 may then be displayed to the user, including: summary of triggers for that deal and current rating values; trigger conditions (expressions) highlighted by RAG; available cure options; cure status; cure clocks.

Risk Calendar

Figure 6:
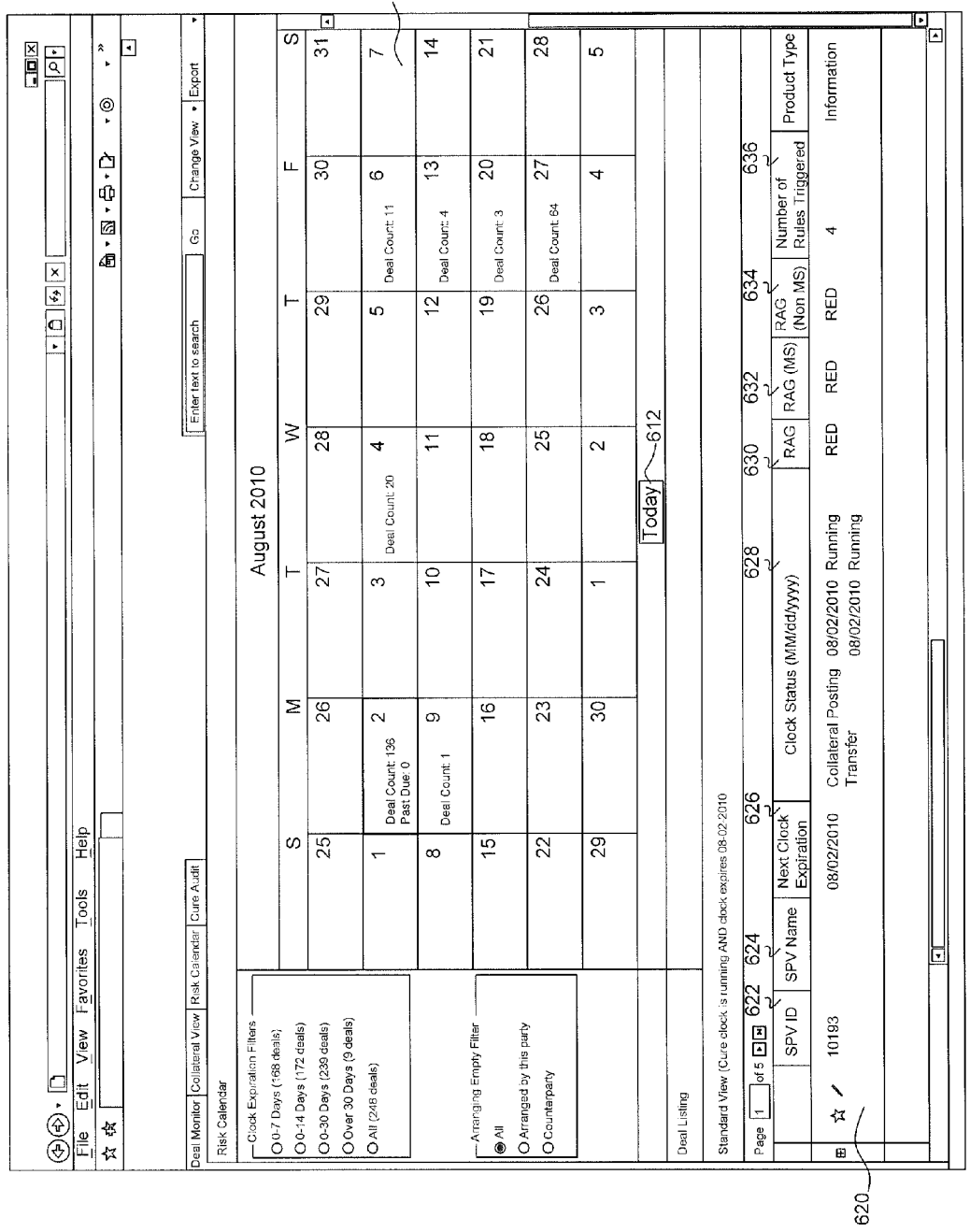
FIG. 6 is a depiction of an example screenshot of a risk calendar tool in accordance with some embodiments.

FIG. 6 is a depiction of an example screenshot of a risk calendar tool in accordance with some embodiments. The Risk Calendar page contains all deals that contain breached triggers that require one or more cures. The default result set contains deals from "Today", where the next clock expiration is today or is past due. Double clicking (or otherwise selecting) a particular day in a calendar 610 may limit the deals displayed in the Deal Listing portion 620 of the screen to deals with cures that have their next clock expiration date on the selected date. Clicking the "Today" button 612 may limit the deals displayed to deals with cures that have their next clock expiration date today or are past due. The "Deal Count" indicator 613 in the calendar indicates the number of deals that have a next clock expiration on that particular date. The "Past Due" indicator 614 in the calendar indicates the number of deals that have not yet been cured and have a next clock expiration date that has passed. The Deal Calendar can be navigated (e.g., from one month to another) in conventional ways, e.g., by left and right arrows located at the top of the calendar or via a dropdown calendar next to the current Month and Year at the top of the calendar.

Information related to deals in the Deal Listing portion 620 of the screen may include various fields, including SPV ID 622, SPV Name 624, Next Clock Expiration 626, Clock Status 628, overall RAG status 630, Party A status 632, non-Party A status 634, and number of rules triggered 636. These fields were discussed above in the context of FIG. 5 and do not require separate explanation here.

In some embodiments, clock expiration filters may be provided to filter deals among any of the following: next clock expiration date that is within 0-7 days, 0-14 days, 0-30 days, over 30 days, and all deals. "0" days includes today and past due. These filters can be used in combination with other filters that filter by all entities, entities related to a first party, and entities not related to the first party (e.g., that are counterparties to the first party). In some embodiments, the user can enter and/or edit cures and see deal information directly from the calendar tool, promoting efficient deal administration and monitoring functionality.

Figure 7:
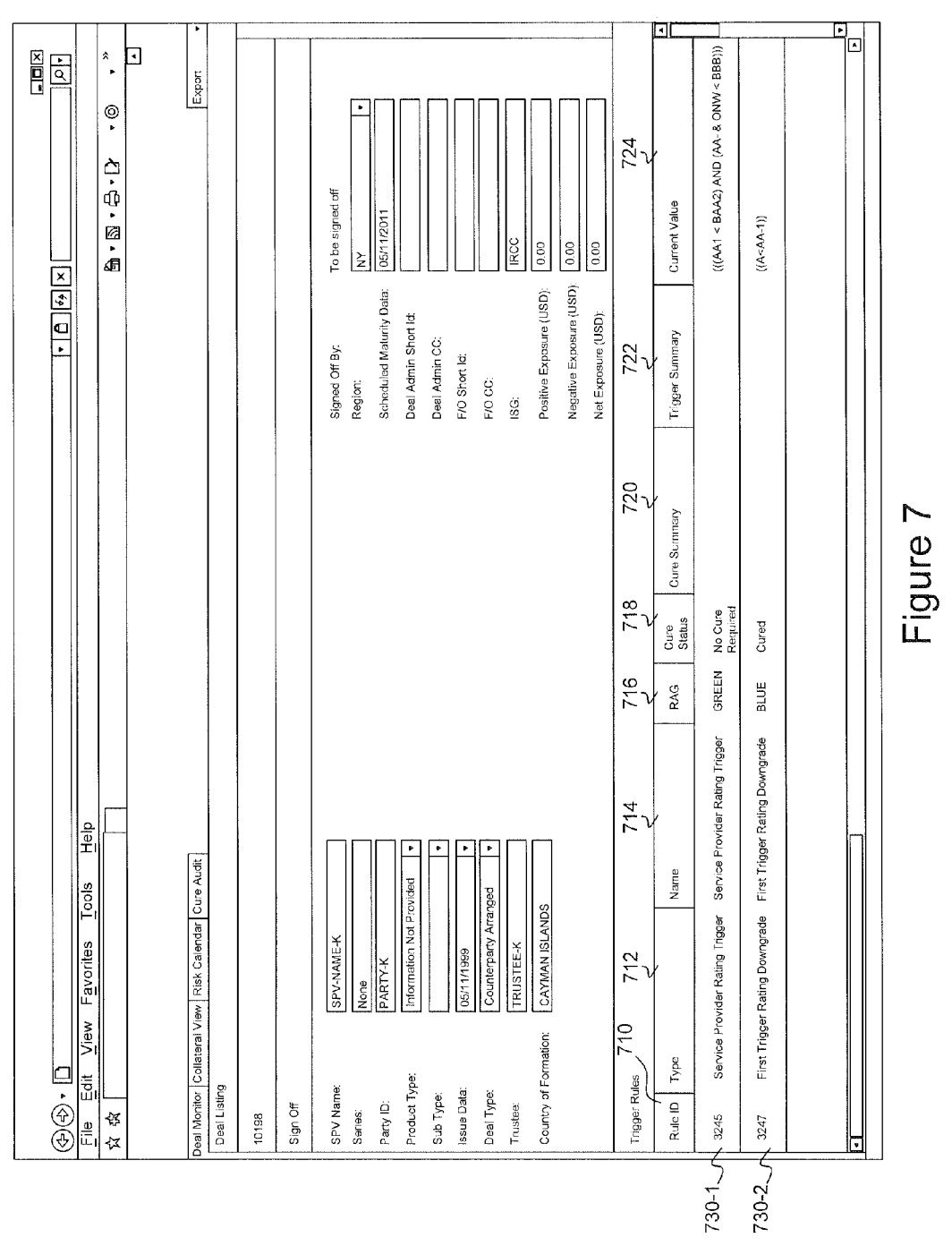

FIG. 7 is a depiction of an example screenshot showing cure tracking functionality in accordance with some embodiments. Information pertaining to various triggers 730-1, 730-2, . . . related to an SPV is shown. Various fields are shown, including rule ID (trigger ID) 710, trigger type 712, trigger name 714, trigger RAG status 716, cure status 718, cure summary 720, trigger summary 722, and current trigger value 724. By providing cure status and cure summary for various triggers at a glance, embodiments enable a deal administrator to quickly identify and track cure information related to multiple triggers.

Figure 8:
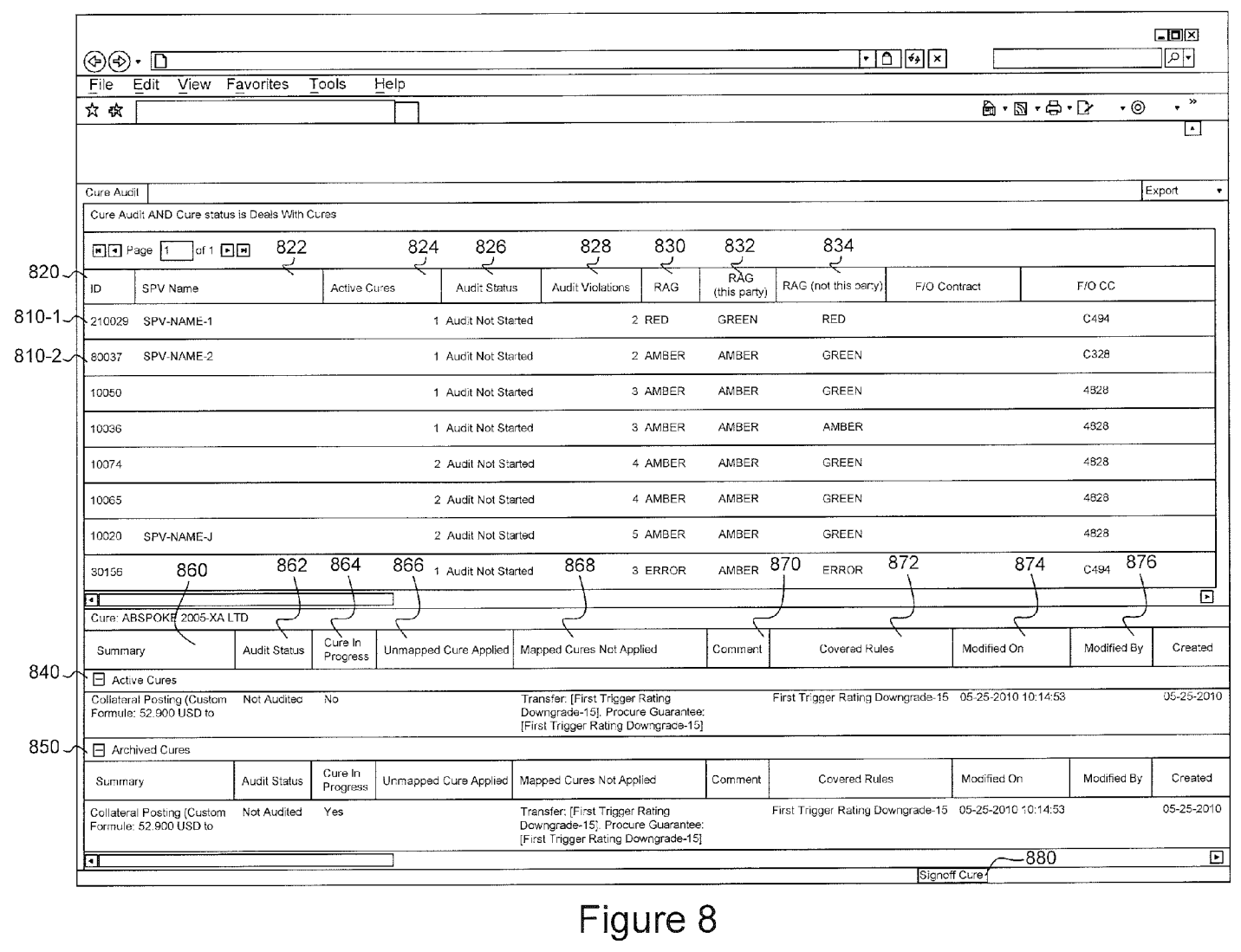

FIG. 8 is a depiction of an example screenshot of a cure audit tool in accordance with some embodiments. Embodiments providing auditing functionality to enable users (e.g., risk supervisors) to track risk monitoring/management activities, e.g., of various deal administrators/operators. Certain types of cure options may be "mapped" for a trigger, i.e., may be considered as standard cure options that are available for that trigger. Deal administrators may also apply unmapped cure options to triggers, and auditors may desire to know details regarding when and how often that occurs. For example, auditors may desire to verify that cures have not been improperly applied. Conventionally, auditing in the risk monitoring industry has been a cumbersome task, as there has not been a systematic framework for providing trigger and cure information for various deals across various deal administrators. Embodiments address these and other challenges related to cure auditing by recording selected cure options in an audit log.

FIG. 8 shows information related to various SPVs 810-1, 810-2, . . . , etc. This view shows all deals that contain triggers that have been cured. In some embodiments, only Risk Officers have access to this page. They may review the cures and sign-off on the final resolution of any audit violations. Clicking on a deal (or otherwise activating them) may open up the cures for that deal in the bottom portion of the page. An 'Active Cures' section 840 may display cures that are currently applied to each of the triggers. An 'Archived Cure' section 850 may display cures that were applied to the triggers but have been edited or removed. After the Risk Officer has reviewed a cure and investigated the audit violations, he/she typically signs off on the deal, e.g., by highlighting the cure to be signed off and clicking the 'Signoff Cure' button 880. In some embodiments, comments must be entered in order to sign off (except in cures where no audit is required).

Various fields are shown, including SPV ID 820, SPV name 822, number of active cures 824, audit status 826, number of audit violations 828, RAG status 830, RAG Party A status 832, and RAG non-party A status 834. Various fields provide information regarding active and archived cures; these fields include: cure summary 860, audit status 862, cure in progress indicator 864, unmapped cures applied field 866, mapped cures not applied field 868, comment 870, covered rules 872, modified-on timestamp 874, and modified-by field 876. Other fields may be provided as well, including: created-on timestamp and created-by field.

An auditor, Risk Officer, or other supervisor may determine which cures have been audited and signed off already by referring to the "Audit Status" field 862. If, after a cure has been signed off, it is determined that the sign-off was incorrect, the Risk Officer can revoke the cure signoff, e.g., by highlighting the cure that will have its signoff revoked and clicking a 'Revoke Cure' button. In some embodiments, comments must be entered in order to revoke signoff. To view the details of a cure's signoffs, revokes, and comments, one may highlight the cure and click a 'Audit History' button.

Various items shown in FIG. 8 are described in Table 5.

TABLE 5

Explanation of items in FIG. 8

| Item | Explanation |
| --- | --- |
| ID | Unique ID for each deal |
| SPV Name | Name of the SPV |
| Active Cures | Indicates the number of cures that have been submitted for a particular deal. Any cures that were submitted and subsequently removed will be considered an "Archived Cure". |
| Audit Status | Indicates whether a particular deal has been audited. The options for this category are: "Audit Not Started" - this status indicates that none of the cures in the deal are currently signed off. "Audit In Progress" - this status indicates that at least one of the cures, but not all of the cures, in the deal are currently signed off. "Audit Completed" - this status indicates that all of the cures in the deal have been signed off "No Audit Required" - this status indicates that there are no audit violations against any of the cures in the deal. Cures can be signed off, but sign-off is not required. |
| Audit Violations | The "Audit Violations" column indicates the number of cure violations the deal has. Violations are caused by unmapped cures applied and mapped cures which have not been applied. The details of what each audit violation is can be found in the Cure summary section found at the bottom of the page after clicking on the deal "Unmapped Cures Applied" refers to cure options that were applied to the trigger but are not one of the cure options that were mapped for the trigger. "Mapped Cures Not Applied" refers to cure options that were mapped for the trigger that have not been applied to cure the trigger. |
| RAG | Indicates the overall RAG status for the deal |
| RAG (Party A) | Indicates the overall RAG for the Deal for triggers related to Party A entities |
| RAG (non Party A) | Indicates the overall RAG for the Deal for triggers related to parties other than Party A entities |
| F/O Contact | Front Office Contact ShortID |
| F/O CC | Cost center associated with Front Office Contact |
| Deal Admin | Deal Administrator Contact ShortID |
| Deal Admin CC | Cost center associated with Deal Administrator |
| Summary | Summary of the cure applied |
| Cures In Progress | Indicates whether any 'In Progress' cures are in place for the deal that have not yet been submitted - Yes/No |
| Unmapped Cures Applied | Refers to cure options that were applied to the trigger but are not one of the cure options that were mapped for the trigger. |

TABLE 5-continued

Explanation of items in FIG. 8

| Item | Explanation |
| --- | --- |
| Mapped Cures Not Applied | Refers to any cure options that were mapped for the trigger that have not been applied to cure the trigger. |
| Comment | Cure comments |
| Covered Rules | Rules 'cured' |
| Modified On | Date cure was modified |
| Modified By | User ID who modified the cure |
| Created On | Date cure was created |
| Created By | User ID who created the cure |

In some embodiments, one or more cure entry/edit screens for curing a breached trigger can be accessed from two views: ☐Deal Monitor and ☐Risk Calendar (both of which were discussed above). When a breached (RED) trigger is highlighted, an 'Add New Cure' button may become active, provided the user has edit capability. The 'Add to Existing Cure' button may become active when a breached trigger is highlighted and at least one cure (In Progress or Completed) already exists for the deal. The user can then choose to group triggers (e.g. First and Second Triggers) to be associated with the cure, or add/change the cures applied. If only one cure exists for that account, then selecting 'Add to Existing Cure' may open that cure for edit. If more than one cure already exists for the deal, the user will be prompted with a pop-up to select which of the existing cures to associate the additional breached triggers. The 'Edit Cure' button may become active when a trigger with a cure applied is highlighted, allowing the user to edit the current cure in place.

Figure 9:
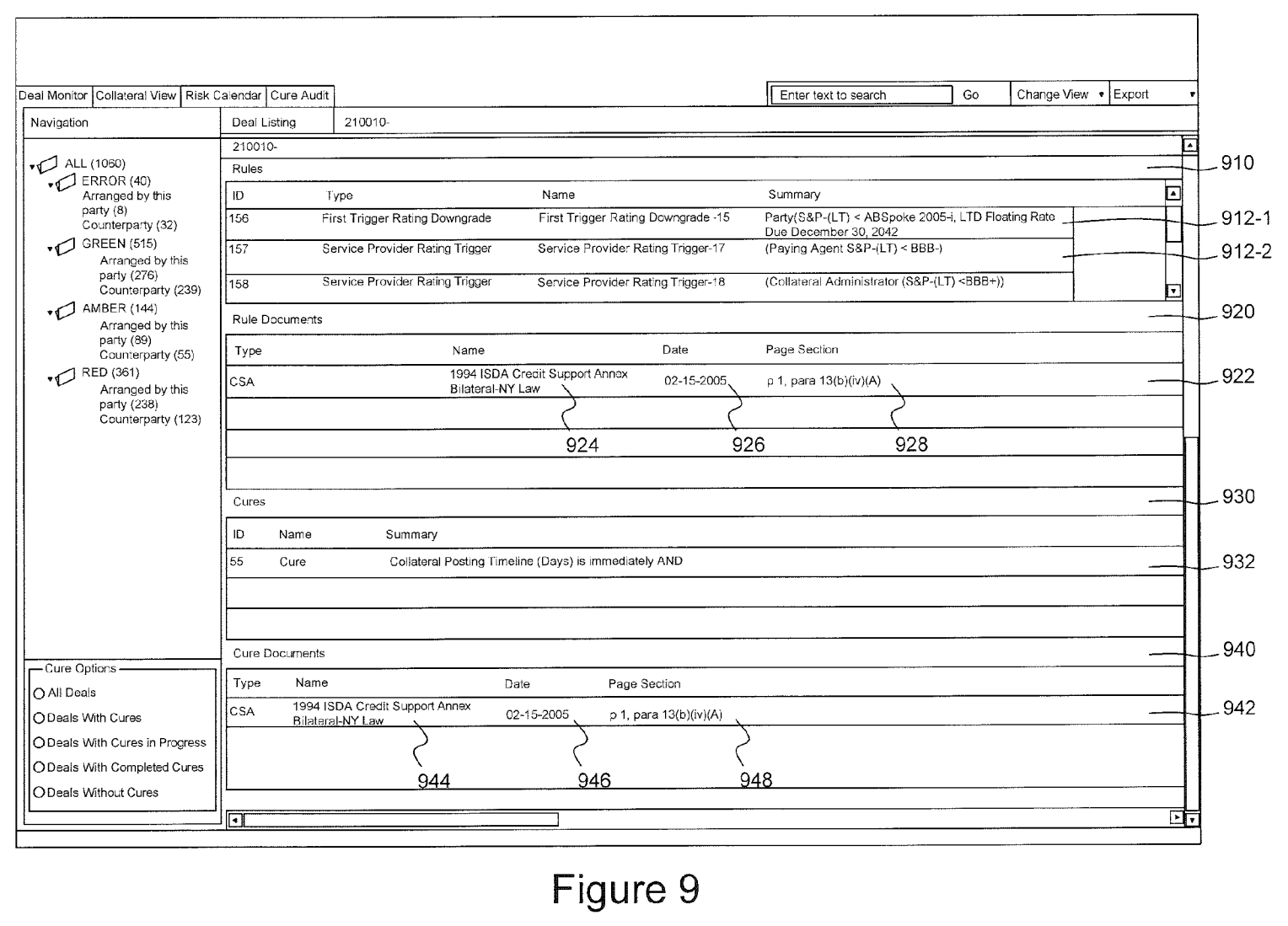

FIG. 9 is a depiction of an example screenshot showing document mapping functionality in accordance with some embodiments. In a Rules pane 910, users can toggle between various rules. The Rules pane 910 shows various rules 912-1, 912-2, . . . , including the logical expressions that make up the rules. A Rules Documents pane 920 lists the deal documents 922, including fields for name 924, associated date 26, and pages/sections 928 that set forth the applicable trigger terms. A Cures pane 930 lists the applicable cures 932 and action items associated with the selected rule. A Cure Documents pane 940 lists the deal documents 942, including fields for name 944, associated date 946, and applicable pages/sections 948 that set forth the cure terms. The items displayed in the Rule Documents pane 920, Cures pane 930, and Cure Documents pane 940 may change as the user highlights/toggles between the various rules in the Rules pane 910. If multiple cures exist per rule, users can toggle between the various cures in the Cure pane 930 as well. Documents that are mapped to as described above may be accessed from deal repository 140 or from another database. In conventional systems, one would have to leaf through various hardcopy documents (or open various electronic documents) and navigate to relevant pages/sections awkwardly in an individualized fashion per rule or cure. In contrast, embodiments allow easy access not just to applicable documents, but to relevant portions therein, from a unified interface.

Some embodiments provide export functionality to simplify reporting. In the Deal Monitor and Risk Calendar screens, there are three exporting options in some embodiments. With a "Deal" option, a deal summary that is shown in the Deal Listing is exported. With a "Deal and Rules" option, each deal and its corresponding triggers are exported. These are the triggers that may be accessed when a "+" symbol (or equivalent) is expanded in the Deal Listing, as discussed above. With a "Deal and Rules (With Conditions)" option, each deal and its corresponding triggers are exported, as well as the current rating values for the conditions listed in the triggers. If a view is already filtered, the exported file may contain only the filtered results. Thus, various types of reports may be automatically generated rapidly, based on current or preset (simulated) values of underlying ratings criteria, to promote efficient administration not available with conventional systems.

Figure 10:
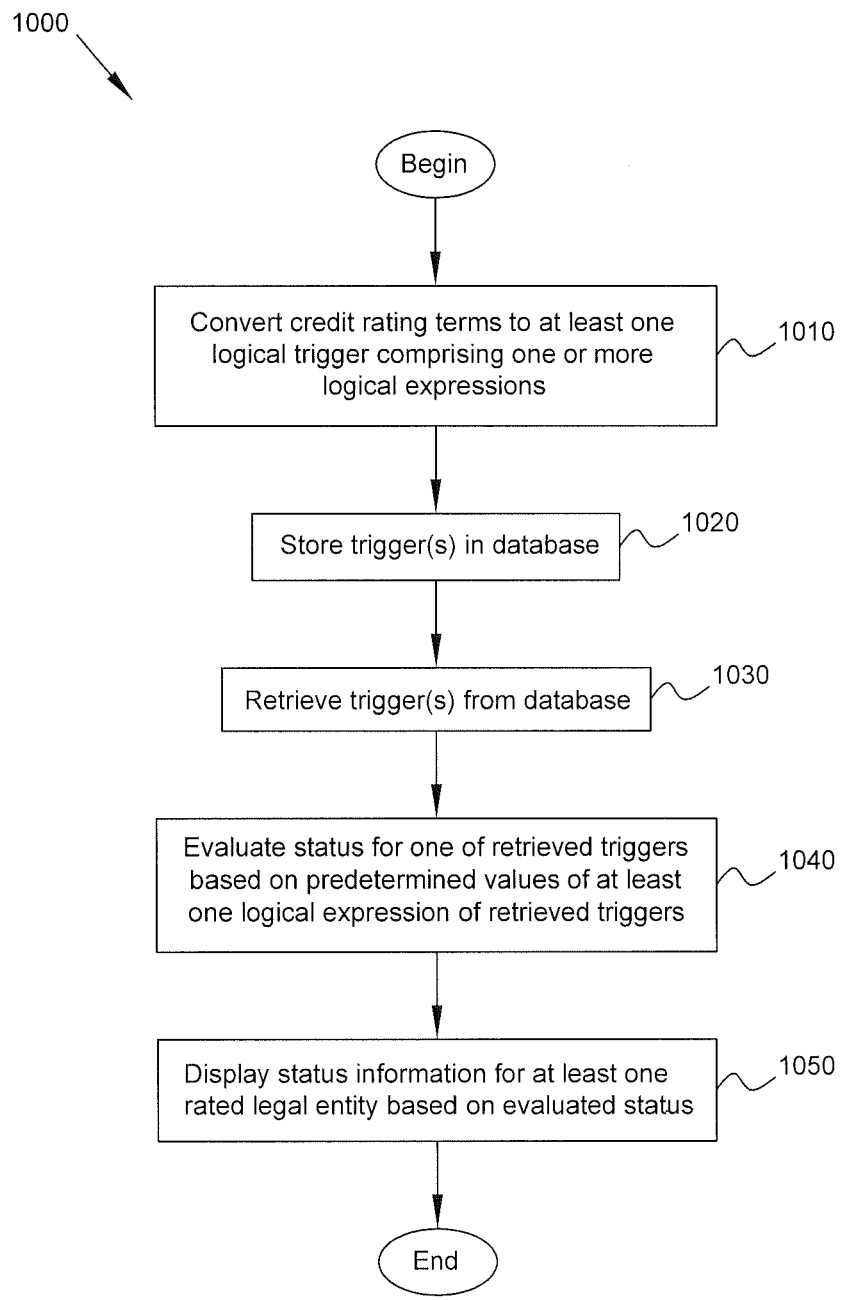
FIG. 10 is a flow diagram of a process in accordance with some embodiments.

FIG. 10 is a flow diagram of a process in accordance with some embodiments. After process 1000 begins, at step 1010, a plurality of credit rating terms related to a rated legal entity may be converted to at least one logical trigger comprising one or more logical expressions. The credit rating terms may impact performance of a legal right or obligation associated with the rated legal entity. The trigger(s) may be stored in a computer database at step 1020. At least one trigger may be retrieved from the database at step 1030. At step 1040, a status for one of the retrieved triggers may be evaluated based on predetermined values of the logical expression(s) of the retrieved trigger. At step 1050, status information for at least one rated legal entity may be displayed based on the evaluated status of the retrieved trigger.

Figure 11:
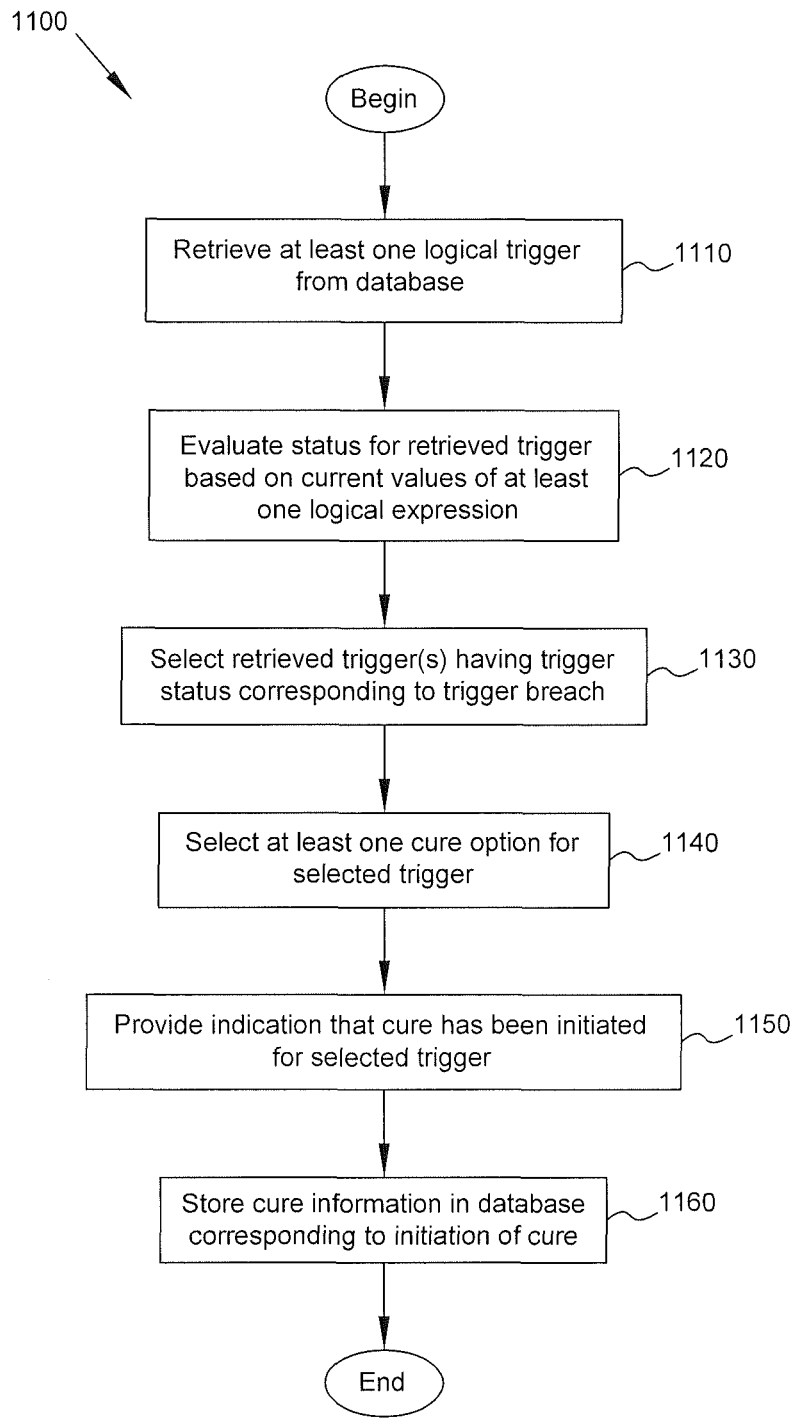
FIG. 11 is a flow diagram of another process in accordance with some embodiments.

FIG. 11 is a flow diagram of another process in accordance with some embodiments. After process 1100 begins, at step 1110, at least one logical trigger may be retrieved from a computer database. The logical trigger includes at least one logical expression representing credit rating terms of a rated legal entity among a plurality of rated legal entities. At step 1120, a status for one of the retrieved triggers may be evaluated based on current values of the at least one logical expression. At step 1130, at least one of the retrieved triggers, having a trigger status corresponding to a potential downgrade of a rating of a corresponding entity, may be selected. At step 1140, at least one cure option for the selected trigger may be selected. At step 1150, an indication is provided that a cure has been initiated for the selected trigger. At step 1160, cure information corresponding to the initiation of the cure may be stored in the database.

Although examples are illustrated and described herein, embodiments are nevertheless not limited to the details shown, since various modifications and structural changes may be made therein by those of ordinary skill within the scope and range of equivalents of the claims.

What is claimed is:

1. A computer-implemented method of reporting an impact of credit ratings on a rated legal entity, the method comprising:
    converting a plurality of credit rating terms related to a rated legal entity to at least one logical trigger comprising one or more logical expressions, the credit rating terms impacting performance of a legal right or obligation associated with the rated legal entity;
    storing the at least one trigger in a computer database;
    using a computer processor, retrieving at least one trigger from the database;
    using the computer processor, automatically evaluating a status for one of said retrieved triggers based on predetermined values of one or more variables that form the at least one logical expression of said at least one retrieved trigger, wherein the predetermined value of each variable is one of a current value and a preset value; and
    automatically displaying status information for at least one rated legal entity based on the evaluated status of said at least one retrieved trigger.

2. The method of claim 1, further comprising determining the plurality of credit rating terms in a governing document related to the rated legal entity.

3. The method of claim 1, wherein the status information is vehicle status information of a financial vehicle related to the legal right or obligation.

4. The method of claim 3, wherein the vehicle status information comprises a vehicle status indicator for the financial vehicle.

5. The method of claim 4, wherein the displayed vehicle status indicator is displayed in a color among a plurality of colors, the color indicating proximity to a breach of any retrieved trigger of the financial vehicle.

6. The method of claim 4, wherein the displayed vehicle status indicators are sorted by vehicle status.

7. The method of claim 4, wherein the displayed vehicle status indicators are sorted by a highest current expression value of a first party.

8. The method of claim 4, wherein the displayed vehicle status indicators are sorted by a highest current expression value of any party other than the first party.

9. The method of claim 4, wherein displaying the vehicle status information comprises displaying vehicle status indicators only for deals having a predetermined deal status.

10. The method of claim 9, wherein only deals in which a first party has the predetermined deal status are displayed.

11. The method of claim 9, wherein only deals in which a counterparty to a first party has the predetermined deal status are displayed.

12. The method of claim 4, wherein displaying the vehicle status information comprises displaying the vehicle status information for at least one of the following: all deals; deals with cures; deals with cures in progress; deals with completed cures; and deals without cures.

13. The method of claim 3, wherein the vehicle status information comprises trigger information of at least one trigger of at least one of the vehicles.

14. The method of claim 13, wherein the trigger information comprises the current values of each logical expression of the at least one trigger.

15. The method of claim 14, wherein the logical expressions have at least three logical levels, and the current values of each logical expression are displayed in a different color for each logical level.

16. The method of claim 13, wherein the trigger information comprises a trigger status of the at least one trigger.

17. The method of claim 16, wherein the displayed trigger status is displayed in a color among a plurality of colors, the color indicating proximity to a breach of a corresponding trigger.

18. The method of claim 17, wherein the displayed trigger status is displayed in a first color for a first level corresponding to trigger breach, in a second color for a second level that is one level away from the first level, and in a third color for a third level that is more than one level away from the first level.

19. The method of claim 18, wherein the first, second, and third colors are red, amber, and green, respectively.

20. The method of claim 19, wherein exceptions in each logical expression are displayed in orange or yellow.

21. The method of 17, wherein the displayed vehicle status indicator is displayed in a cured color not among the plurality of colors in an event a cure has been applied and completed in response to a breach of a corresponding trigger.

22. The method of claim 16, wherein the trigger information comprises a cure status of triggers having a predetermined trigger status, the cure status indicating whether a cure is required to prevent a rating downgrade.

23. The method of claim 16, wherein the trigger information comprises a cure summary of a cure applied in response to the at least one trigger having a predetermined trigger status corresponding to a trigger breach.

24. The method of claim 3, wherein at least one trigger comprises multiple logical expressions, each logical expression having at least two possible logical values.

25. The method of claim 24, wherein each logical expression has at least three possible logical values and at least two logical expressions are combined with a ternary AND joining function.

26. The method of claim 24, wherein each logical expression has at least three possible logical values and at least two logical expressions are combined with a ternary OR joining function.

27. The method of claim 1, wherein the vehicle is a special purpose vehicle.

28. The method of claim 27, wherein the logical expressions include terms related to parties, securities, underlying assets, ratings downgrades, and an absence of long-term or short-term ratings.

29. The method of claim 1, wherein the vehicle is a real estate investment trust.

30. The method of claim 1, further comprising applying at least one cure to a trigger that has been breached.

31. The method of claim 30, wherein the at least one cure is selected from the group consisting of collateral posting, obtain legal opinion, procure guarantee, and other cure option.

32. The method of claim 1, further comprising applying a cure to multiple triggers that have been breached.

33. A system for reporting an impact of credit ratings on a rated legal entity, the system comprising:
a computer database configured to store a plurality of triggers, each trigger comprising one or more logical expressions representing credit rating terms of a rated legal entity among a plurality of rated legal entities;
a computer processor operatively coupled to access the database via a communications infrastructure; and
a computer readable storage medium comprising computer-executable instructions stored thereon, said instructions when executed causing said processor to:
retrieve at least one trigger from the database;
evaluate a status for one of said retrieved triggers based on predetermined values of one or more variables that form the one or more logical expressions of said at least one retrieved trigger, wherein the predetermined value of each variable is one of a current value and a preset value; and
displaying status information for at least one rated legal entity based on the evaluated status of said at least one retrieved trigger.

34. The system of claim 33, further comprising a term input module configured to receive a plurality of credit rating terms determined from a governing document related to the rated legal entity, the credit rating terms impacting performance of a legal right or obligation associated with the rated legal entity.

35. A computer-implemented method for monitoring an impact of a ratings downgrade cure of a rated legal entity, the method comprising:
using a computer processor, retrieving, from a computer database, at least one logical trigger comprising at least one logical expression representing credit rating terms of a rated legal entity among a plurality of rated legal entities;
using the computer processor, automatically evaluating a status for one of said retrieved triggers based on current values of one or more variables that form the at least one logical expression;
selecting at least one of said retrieved triggers having a trigger status corresponding to a trigger breach;
selecting at least one cure option for the selected trigger;
providing an indication that a cure has been initiated for the selected trigger;
storing cure information in the database corresponding to the initiation of the cure; and
displaying a cure completion indicator upon completion of the cure.

36. The method of claim 35, further comprising reevaluating a status for said one of said retrieved triggers based on the cure.

37. The method of claim 35, further comprising marking the cure as complete.

38. The method of claim 37, further comprising displaying at least one trigger associated with a completed cure in a predetermined color, wherein said predetermined color is different from colors used for displaying triggers that are not associated with a completed cure.

39. The method of claim 35, further comprising recording the selected cure option in an audit log.

40. The method of claim 35, wherein the at least one cure option is selected from the group consisting of collateral posting option, obtain legal opinion, procure guarantee, and other cure option.

41. The method of claim 40, wherein the collateral posting option is selected from the group consisting of mark to market, premium over mark to market, aggregate of all premiums due for the rated legal entity, present value, and weighted average life of trade.

42. The method of claim 35, further comprising automatically generating a cure history report for the at least one entity.

43. The method of claim 42, wherein the cure history report is only generated for entities impacted by a trigger associated with a predetermined party.

44. A system for monitoring an impact of a ratings downgrade cure of a rated legal entity, the system comprising:
a computer database configured to store a plurality of triggers, each trigger comprising one or more logical expressions representing credit rating terms of a rated legal entity among a plurality of rated legal entities;
a computer processor operatively coupled to access the database via a communications infrastructure; and
a computer readable storage medium comprising computer-executable instructions stored thereon, said instructions when executed causing said processor to:
retrieve, from the computer database, at least one logical trigger comprising at least one logical expression representing credit rating terms of the rated legal entity;
evaluate a status for one of said retrieved triggers based on current values of one or more variables that form the at least one logical expression;
select at least one of said retrieved triggers having a trigger status corresponding to a trigger breach;
select at least one cure option for the selected trigger;
provide an indication that a cure has been initiated for the selected trigger;
store cure information in the database corresponding to the initiation of the cure; and display a cure completion indicator upon completion of the cure.

* * * * *